United States Patent [19]
Hirata et al.

[11] Patent Number: 5,723,152
[45] Date of Patent: Mar. 3, 1998

[54] APPARATUS FOR VACUUM MOLDING EXPANDED SYNTHETIC RESIN PARTS

[75] Inventors: Yutaka Hirata; Teruo Iwai; Toshio Iwasawa, all of Yokohama, Japan

[73] Assignee: Bridgestone Corporation, Tokyo, Japan

[21] Appl. No.: 681,931

[22] Filed: Jul. 30, 1996

[30] Foreign Application Priority Data

Aug. 1, 1995 [JP] Japan ................................. 7-196843

[51] Int. Cl.[6] ................................................ B29C 44/58
[52] U.S. Cl. ........................ 425/4 R; 425/812; 425/817 R
[58] Field of Search ............................... 425/4 R, 817 R, 425/405.1, 812, 470

[56] References Cited

U.S. PATENT DOCUMENTS

| | | | |
|---|---|---|---|
| 3,970,732 | 7/1976 | Slaats et al. | 425/817 R |
| 4,422,840 | 12/1983 | Posch et al. | 425/812 |
| 4,542,887 | 9/1985 | Bethell et al. | 425/812 |
| 4,608,213 | 8/1986 | Kurumizawa et al. | 264/45.1 |
| 4,973,235 | 11/1990 | Shoji | 425/4 R |
| 4,997,356 | 3/1991 | Katagiri | 249/184 |
| 5,007,815 | 4/1991 | Shoji | 425/817 R |
| 5,039,291 | 8/1991 | Iwasawa et al. | 425/812 |
| 5,098,271 | 3/1992 | Yanagishita | 425/812 |
| 5,451,151 | 9/1995 | Russell | 425/4 R |

FOREIGN PATENT DOCUMENTS

| | | | |
|---|---|---|---|
| 0448063 A1 | 9/1991 | European Pat. Off. | |
| 0461522 A2 | 12/1991 | European Pat. Off. | |
| 130846 | 5/1978 | German Dem. Rep. | 425/4 R |
| 1285169 | 12/1968 | Germany | |
| 58-67427 | 4/1983 | Japan | |
| 62-238713 | 10/1987 | Japan | 425/812 |
| 2-141213 | 5/1990 | Japan | |
| 3-36020 | 2/1991 | Japan | |
| 977606 | 12/1964 | United Kingdom | |

*Primary Examiner*—Robert Davis
*Attorney, Agent, or Firm*—Sughrue, Mion, Zinn, Macpeak & Seas, PLLC

[57] ABSTRACT

A mold apparatus for producing a synthetic resin foam part has a mold assembly (1) including a lower mold (2), an upper mold (3) removably attached to the lower mold to define a closed space, and an insert (4) removably disposed in the closed space. The insert has a partition (6) which is faced to the upper mold through a gap (11). The partition defines a chamber (7) between the insert and the upper mold. The closed space excluding the chamber constitutes a cavity (8) into which a molding compound is introduced. A pressure regulator means (21) is provided for exhausting air from the chamber (7) to keep the chamber in a subatmospheric pressure whereby air in the cavity (8) is also exhausted through the gap. A foam part is produced by feeding a synthetic resin blow molding compound into the cavity (8) under atmospheric pressure, tightly closing the mold assembly, exhausting air from the chamber and from the cavity through the gap to establish a subatmospheric pressure in the cavity, and causing the molding compound to be blow molded.

9 Claims, 7 Drawing Sheets

APPARATUS FOR VACUUM MOLDING EXPANDED SYNTHETIC RESIN PARTS

BACKGROUND OF THE INVENTION

1. Field of the Invention

This invention relates to a mold apparatus for use in the molding of parts of expanded synthetic resin, preferably having an open cell structure, typically parts of flexible polyurethane foam. It also relates to a method for molding such parts using the mold apparatus.

2. Prior Art

Figure 11:
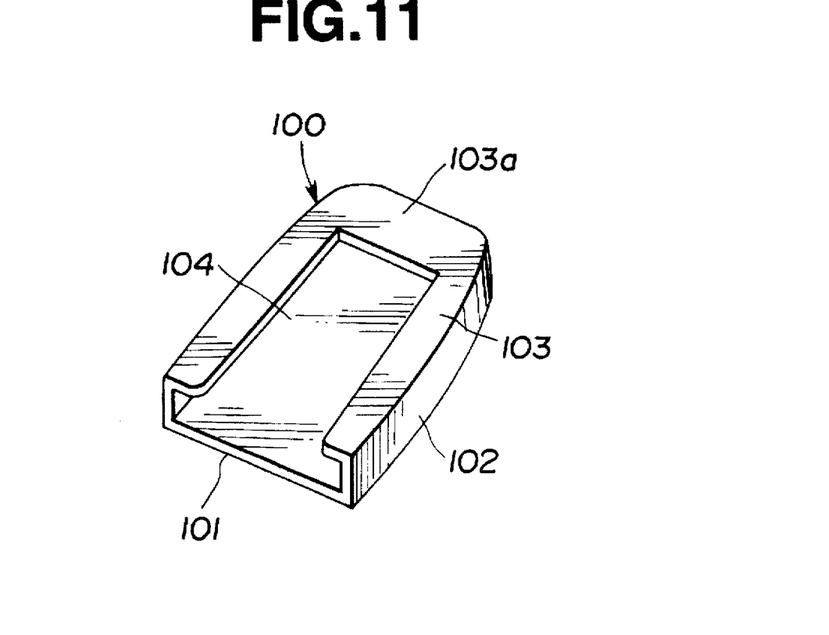
FIG. 11 is a perspective view showing one exemplary front back pad.
Figure 12:
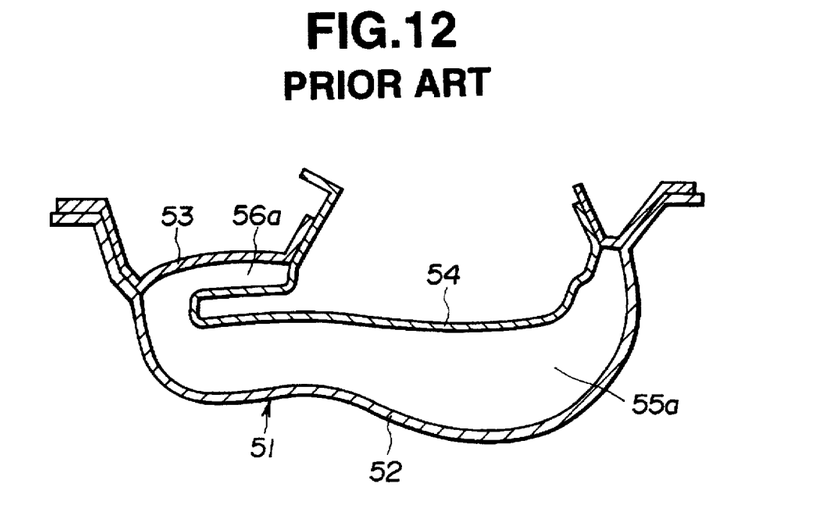
FIG. 12 is a schematic cross-sectional view in one direction of a prior art mold for a front back pad.
Figure 13:
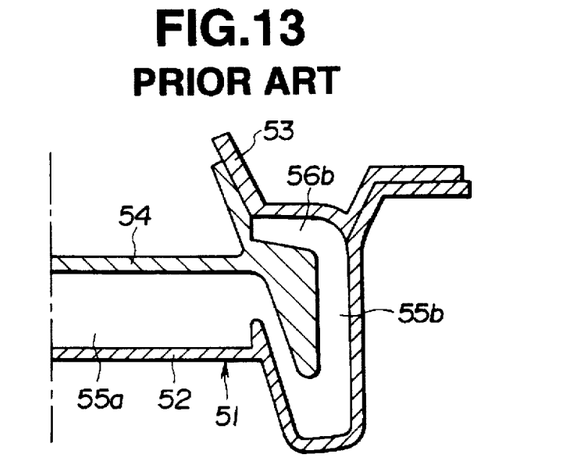
FIG. 13 is a schematic cross-sectional view in a perpendicular direction of the prior art mold.

Automotive seat back pads are conventionally formed of flexible polyurethane foam. One exemplary pad is shown in FIG. 11. The pad 100 has a face portion 101, a side portion 102, and a back portion 103 which are integrally molded. The back portion 103 is formed with an opening 104 so that the back portion 103 is of an inverted U shape. Thus the pad 100 as a whole has a bag or curved channel shape. When it is desired to mold such a bag shaped pad 100, a mold assembly 51 as shown in FIGS. 12 and 13 is used in the prior art. More particularly, the mold assembly 51 is a three-sectional mold assembly consisting of a lower mold 52, an upper mold 53, and an insert 54. The lower mold 52 and the insert 54 define therebetween cavities 55a, 55b for forming the face and side portions. The upper mold 53 and insert 54 define therebetween cavities 56a, 56b for forming the back portion. A molded part is prepared by feeding a flexible polyurethane foam molding compound into the cavities 55a, 55b, 56a, 56b, fastening the molds, and causing the molding compound to expand.

Figure 14:
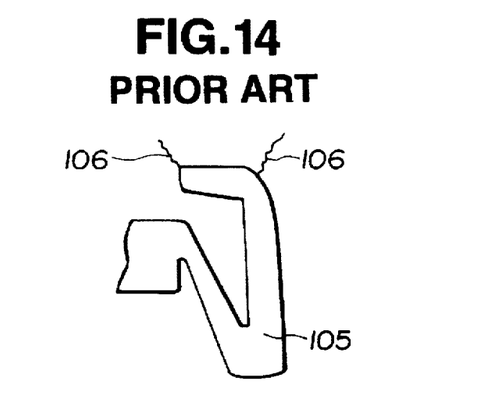
FIG. 14 is schematic illustration of a urethane foam part obtained using the mold of FIGS. 12 and 13, showing burrs thereon.

Several problems arise in molding a pad as shown in FIG. 11. In order to mold an upper part 103a of the back portion 103 of the pad 100, generally known as a top pad part, the cavity 56a for forming the top pad part must be filled with the molding compound to its deepest point. To this end, it is a common practice to introduce the molding compound into the cavities 55a, 55b, 56a, 56b in slight excess of the necessity for thereby increasing the blowing pressure within the mold cavity. This results in the following problems. (1) An amount of molding compound in excess of the necessity is used. (2) As a result of extra feed of the molding compound in the cavity, more reaction gas is given off to increase the rate of rejection, particularly when a part of complex shape like the seat back pad shown in FIG. 11 is to be molded. (3) As the blowing pressure within the mold cavity increases, more burrs 106 are formed on the molded part 105 at the mold split positions or parting lines as shown in FIG. 14. After removal from the mold, an extra step is needed for deburring, tailoring and finishing.

In conjunction with the molding of automotive interior parts such as cushion pads from a polyurethane foam molding compound, a method for controlling the pressure in the mold cavity is proposed in Japanese U.M. Application Kokai No. 60418/1983. In this method, the mold cavity is defined between a lower mold and an insert. An upper mold is attached so as to cover the lower mold and the insert and define a pressure regulating chamber between the insert and the upper mold. The insert is provided with a vent hole for providing fluid communication between the chamber and the mold cavity. Then air in the cavity is discharged into the cheer through the vent hole.

Although this method uses the lower mold, insert and upper mold, the cavity for molding a part is defined by the lower mold and the insert. Therefore, the molded part is produced using only the lower mold and the insert while the upper mold only serves to define the pressure regulating chamber with the insert. In an essential sense, therefore, this mold assembly is a two-sectional mold rather than a three-sectional mold. Then this mold assembly cannot produce a bag-shaped part having a top pad portion 103a as shown in FIG. 11. It is still necessary to use a three-sectional mold as shown in FIGS. 12 and 13 when it is desired to mold a bag-shaped part as shown in FIG. 11. Also for the molding of undercut parts, the apparatus of Japanese U.M. Application Kokai No. 60418/1983 is not applicable.

The apparatus of Japanese U.M. Application Kokai No. 60418/1983 further suffers from an increased rate of rejection in molding pads of relatively simple shape because air voids are formed near the parting line. Since regulation of the pressure between the cavity and the chamber is performed by way of the vent hole, the vent hole must be increased in size or number. Then air is locally exhausted to disorder the expansion balance of foam. It is cumbersome to trim off burrs formed in the vent hole(s) at the end of molding.

Japanese Patent Publication (JP-B) No. 102583/1995 discloses a method for molding a polyurethane foam part comprising the steps of reducing the gas pressure in a mold cavity, introducing into the mold cavity a polyurethane stock in the form of a mixture of 100 parts by weight of a polyol component and 0.1 to 0.6 part by weight of water as a blowing agent, and expanding the stock to flow in and fill the cavity. In this method, however, the gas pressure in the mold cavity is reduced by evacuating the cavity through a gap at the parting plane between two mold sections. The periphery of the mold along the parting plane is surrounded by a closed chamber which is evacuated to exhaust air from the cavity through the gap between the parting planes. Burrs or fins are often formed in the gap between the parting planes.

SUMMARY OF THE INVENTION

An object of the invention is to provide an apparatus and method for effectively molding a synthetic resin foam part such as automotive cushion pads (e.g., seat back pads) and automotive interior parts at a high blowing magnification to a low density in high yields while minimizing burr formation.

In a first aspect of the present invention, there is provided a mold apparatus for producing a synthetic resin foam part, comprising a mold assembly. The mold assembly comprises a lower mold having an upward open recess, an upper mold removably attached to the lower mold to cover the open recess to define a closed space, and an insert removably disposed in the closed space. The insert on its upper surface is provided with a partition which is faced to the upper mold through a gap, the partition defines a chamber between the upper surface of the insert and the upper mold, and the closed space excluding the chamber constitutes a cavity into which a synthetic resin foam molding compound is introduced. The apparatus further has a pressure regulator means for exhausting air from the chamber to keep the chamber in a subatmospheric pressure whereby air in the cavity is also exhausted through the gap when air in the chamber is exhausted.

Preferably, the pressure regulator means includes means for supplying air into the subatmospheric chamber to restore atmospheric pressure in the chamber whereby air is also supplied to the cavity through the gap when air is supplied into the chamber.

Preferably, the synthetic resin foam part is a flexible polyurethane foam part.

The mold apparatus is preferably adapted for molding an automotive seat pad of flexible polyurethane foam wherein the insert partition has a front portion spaced from a front end of the insert wherein a top pad-molding cavity is defined between the upper surface of the insert and the upper mold and between the front end of the insert and the front portion of the insert partition.

Preferably, the pressure regulator device includes a discharge conduit having one end connected to the chamber and another end connected to a vacuum pump, and parallel large and small diameter discharge valves inserted in the discharge conduit in a switchable relationship so that either one of the large and small diameter discharge valves may be selected. Air in the chamber is exhausted through the large diameter discharge valve until nearly the subatmospheric pressure is established in the chamber, and thereafter switching is made to select the small diameter discharge valve for further continuing air exhaustion.

Preferably, the pressure regulator means includes an ejector and an air tank filled with compressed air. The ejector includes a flowpath connected to the air tank, a nozzle at an outlet of the flowpath for ejecting compressed air incoming from the tank through the flowpath, a discharge flowpath for discharging compressed air ejected from the nozzle, and a suction branch in fluid communication with a position where compressed air is ejected from the nozzle, and the suction branch is connected to the chamber in the mold assembly. Compressed air in the air tank is ejected from the nozzle to form a jet by which air in the suction branch is exhausted and discharged through the discharge flowpath, whereby the chamber in the mold assembly in communication with the suction branch is evacuated.

In one preferred embodiment, the mold apparatus is mounted on a movable carriage wherein the carriage travels through a heating furnace while the mold cavity is kept in the subatmospheric pressure.

In a second aspect of the present invention, there is provided a method for molding a synthetic resin foam part using the mold apparatus of the first aspect, comprising the steps of:

feeding a synthetic resin foam molding compound into the cavity under atmospheric pressure, tightly closing the mold assembly, actuating the pressure regulator means to exhaust air in the chamber and air in the cavity through the gap to establish a subatmospheric pressure in the cavity, and causing the molding compound to be foam molded.

Preferably, the method further comprising the steps of:

introducing air into the subatmospheric chamber to restore atmospheric pressure in the chamber at the end of foam molding, thereby introducing air into the cavity through the gap to restore atmospheric pressure in the cavity, detaching the upper mold and the insert from the lower mold, and taking out the molded foam part.

Preferably, the synthetic resin foam part is a flexible polyurethane foam part.

The method is preferably adapted for molding an automotive seat pad of flexible polyurethane foam wherein the insert partition has a front portion spaced from a front end of the insert wherein a top pad-molding cavity is defined between the upper surface of the insert and the upper mold and between the front end of the insert and the front portion of the insert partition.

Preferably, the step of exhausting air in the chamber and air in the cavity through the gap to establish a subatmospheric pressure in the cavity includes two stages of quickly exhausting air in the chamber until the chamber reaches near the target subatmospheric pressure and thereafter effecting fine pressure control so as to establish and keep the target subatmospheric pressure in the chamber.

In one preferred embodiment wherein the pressure regulator means comprises an ejector and an air tank for feeding compressed air to the ejector, and the ejector has a suction branch connected to the chamber in the mold assembly, the step of actuating the pressure regulator means to exhaust air in the chamber and air in the cavity through the gap to establish a subatmospheric pressure in the cavity includes ejecting compressed air from the ejector to form a jet by which air in the suction branch is exhausted to evacuate the chamber in the mold assembly in communication with the suction branch.

In a further preferred embodiment, the method further comprises the steps of: mounting the mold apparatus on a movable carriage, moving the carriage to a loading position where a synthetic resin foam molding compound is fed into the cavity under atmospheric pressure, moving the carriage through a heating furnace, thereby causing the molding compound to be foam molded under subatmospheric pressure, and finally moving the carriage to an unloading position where the molded foam part is taken out of the mold assembly.

In the molding apparatus and method of the invention, the mold cavity is charged with the synthetic resin foam molding compound and then evacuated to vacuum before the molding compound is expanded and molded under vacuum. By virtue of an increased blowing magnification, the invention allows a least necessary amount of molding compound to be fed into the cavity and molded into a foam part having a lower density. Since the mold cavity is under a negative pressure, formation of burrs or fins is minimized. Using a mold assembly comprising a lower mold, insert and upper mold, any parts of complex shape such as automotive seat pads as shown in FIG. 11 can be produced in high yields to a lighter weight than conventionally molded parts. Formation of burrs is reduced or eliminated. Trimming and finishing steps are significantly mitigated. The drawbacks of the apparatus of Japanese U.M. Application Kokai No. 60418/1983 are eliminated. The invention is advantageous particularly when foam parts having an open-cell structure, typically flexible polyurethane foam parts or foam pats having a closed-cell structure (whose cells are subsequently crushed into open cells if necessary) are molded.

After blow molding, the chamber and cavity which have been in subatmospheric pressure are relieved to restore atmospheric pressure and thereafter, the upper mold and insert are detached from the lower mold and the molded part is taken out. The restoration of atmospheric pressure allow for easy removal of the upper mold and insert from the lower mold. The mold removal step is very smooth. If the chamber and cavity are kept in vacuum, it requires a very strong force to detach the upper mold and insert from the lower mold. Beyond a certain degree of vacuum, the mold assembly cannot be opened. According to the invention, the mold assembly can be smoothly opened since the pressure difference between the chamber and the ambient atmosphere is eliminated before mold opening.

In evacuating the cavity, evacuation is done through a large diameter discharge valve until the target subatmospheric pressure (or vacuum) is reached or approached. Then, the valve mechanism is changed over to a small diameter discharge valve, through which fine pressure control is carried out to establish the target subatmospheric pressure. This minimizes the fluctuation of reduced pressure across the target value to ensure production of foam parts having a satisfactory surface state without irregular and collapsed cells.

In one embodiment, the vacuum foam molding process is carried out in a stationary mold apparatus. In another embodiment, the vacuum foam molding process is carried out in a small scale circular line (known as a turn table) along which about ten carriages having mold assemblies mounted thereon travel. In a further embodiment, the vacuum foam-molding process is carried out in a large scale circulating line (known as a race track line) along which about two scores of carriages having mold assemblies mounted thereon travel. In the last embodiment, it is preferred to use an ejector and an air tank as the pressure regulator.

Figure 10:
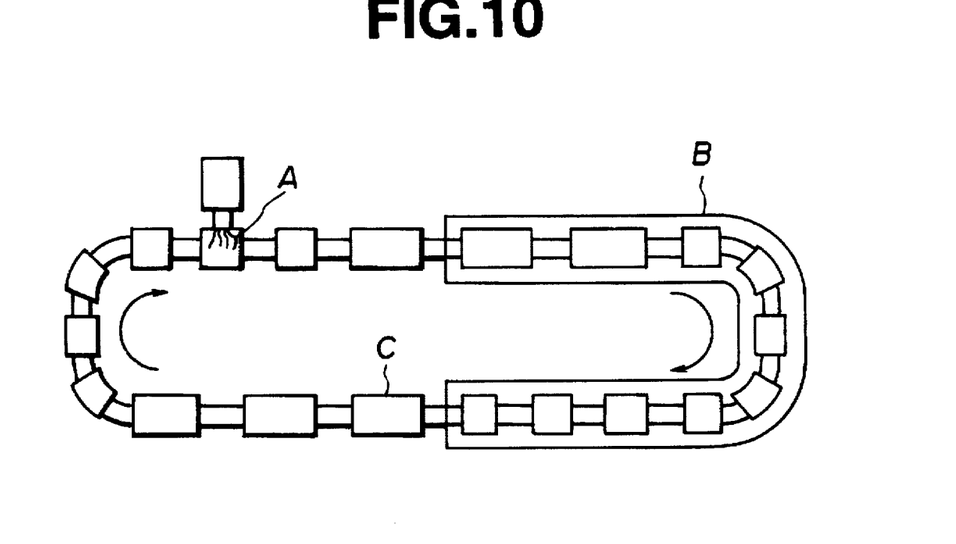
FIG. 10 is a schematic view of a circulating line.

In general, automotive seat cushion pads of flexible polyurethane foam are produced by circulating carriages each having a mold assembly mounted thereon along a closed loop. Such a circulating loop is shown in FIG. 10. The carriage having a mold assembly mounted thereon is moved to a charging position A where a flexible polyurethane foam molding compound is supplied into the mold cavity, transferred to and passed through a heating furnace B where the molding compound is expanded and cured, and finally moved to an unloading position C where the molded foam part is taken out. When the vacuum foam molding process is carried out along the circulating race track loop, the pressure regulator should also be mounted on each carriage and passed through the heating furnace. Then the carriage and circulating loop become complex. If the pressure regulator such as a vacuum pump is exposed to high temperatures of 100° to 200° C., it can be damaged. In contrast, when an ejector and an air tank are used as the pressure regulator, the pressure regulator becomes compact and is mountable on the carriage without troubles. No damage occurs upon exposure to high temperature in the heating furnace. Then the mold assembly with the ejector/tank pressure regulator is compatible with the circulating race track loop so that synthetic resin foam parts can be effectively foam molded in a vacuum. It is unnecessary to establish a high vacuum in the cavity. Since a subatmospheric pressure of about 460 to 660 mmHg is fully acceptable, the vacuum capability of an ejector is sufficient.

BRIEF DESCRIPTION OF THE DRAWINGS

These and further features of the present invention will be apparent with reference to the following description and drawings, wherein.

DETAILED DESCRIPTION OF THE INVENTION

The method for molding parts of expanded synthetic resin according to the invention is suited for the molding of parts of expanded synthetic resin having an open or closed-cell structure, typically parts of flexible polyurethane foam. The instant method is effective in the molding of automotive cushion pads such as bag-shaped seat back pads having a top pad portion 103a as shown in FIG. 11 and other automotive interior parts. The instant method is effective especially when molded parts are produced using a three or multi-sectional mold assembly.

The molding method of the invention involves feeding a synthetic resin foam molding compound into a mold cavity under atmospheric pressure, establishing a subatmospheric pressure in the mold cavity, causing the molding compound to expand in the cavity under the subatmospheric pressure, allowing the mold cavity to restore atmospheric pressure, opening the mold, and taking the molded part out of the mold.

Figure 1:
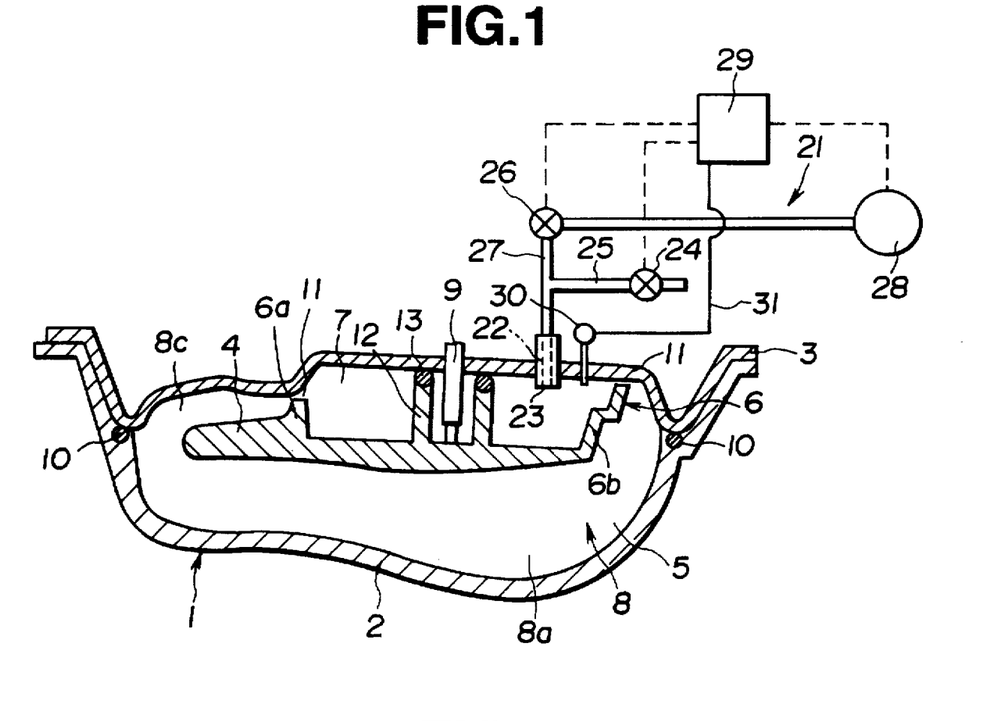
FIG. 1 is a schematic cross-sectional view in one direction of a mold assembly for a front back pad according to one embodiment of the invention.
Figure 2:
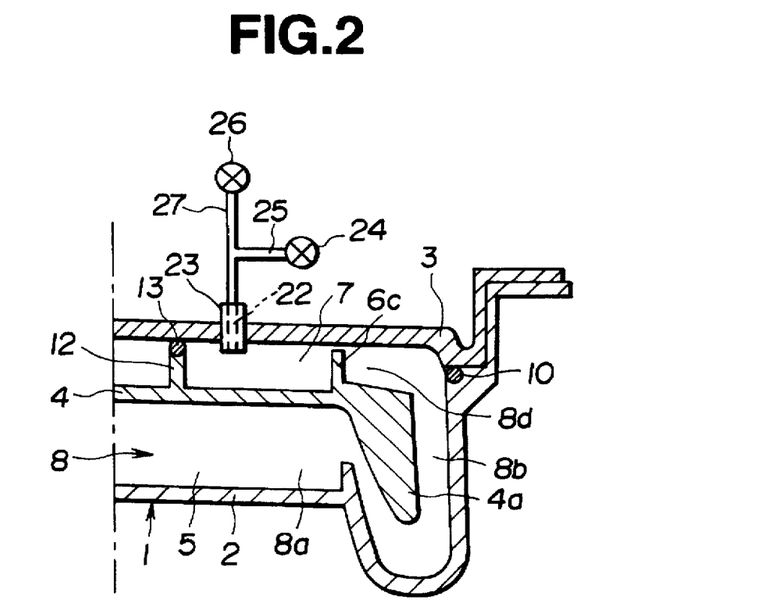
FIG. 2 is a schematic cross-sectional view in a perpendicular direction of the same mold assembly as in FIG. 1.

It is described how to mold a bag-shaped seat back pad as shown in FIG. 11. Referring to FIGS. 1 and 2, a mold assembly for use in such molding according to a first embodiment of the invention is generally designated at 1. For brevity's sake, the terms "upper" and "lower" are used as viewed in FIGS. 1 and 2 and the term "front" and "rear" correspond to the left and right as viewed in FIG. 1. The mold assembly has a three-sectional structure including a lower mold 2 having an upward open recess, an upper mold 3, and an insert 4. The upper mold 3 is removably mated with the lower mold 2 to close its open recess and define a closed space 5. The insert 4 is removably disposed in the closed space 5.

The insert 4 on the upper surface is integrally formed with an upward extending, generally rectangular frame-shaped partition 6. The partition 6 includes a front portion 6a spaced a predetermined distance from the front end of the insert 4, a rear portion 6b positioned at the rear end of the insert 4, and side portions 6c positioned inward of the side edges of the insert 4. The partition 6 defines a chamber 7 between the upper surface of the insert 4 and the lower surface of the upper mold 3. The closed space 5 excluding the chamber 7 is a cavity 8. Differently stated, the cavity 8 includes a face portion-molding cavity 8a defined between the lower surface of the insert 4 and the upper surface of the lower mold 2, side portion-molding cavities 8b defined between the outer side surfaces of wedges 4a integrally formed with the side edges of the insert 4 and the inner side surface of the lower mold 2, and rear portion-molding cavities 8c, 8d defined between the upper surface of the insert 4 and the lower surface of the upper mold 3. The space defined between the upper surface of the insert 4 and the lower surface of the upper mold 3 and extending from the front end of the insert 4 to the partition front portion 6a is the cavity 8c for forming the top pad portion.

The insert 4 is arranged for vertical motion in the closed space 5. That is, the insert 4 is held at a predetermined position by means of a pneumatic cylinder 9. Though not shown, the upper mold 3 is fixedly secured to a frame and the lower mold 2 is supported by contractible means such as an air bag so that the lower mold 2 may be set in place and separated from the upper mold 3.

A gasket 10 is interposed at the parting line between the lower and upper molds 2 and 3. It is then possible to fasten the lower and upper molds 2 and 3 into air-tight engagement, preventing passage of air across the parting line.

When the upper mold 3 and insert 4 are set relative to the lower mold 2 as shown in FIG. 1, a gap 11 is left between the top of the partition 6 of the insert 4 and the lower surface of the upper mold 3. The gap 11 provides fluid communication between the chamber 7 and the cavity 8, allowing air to flow therebetween.

The insert 4 on the upper surface is further provided with a separation wall 12 which surrounds the pneumatic cylinder 9. A gasket 13 is interposed between the top of the separation wall 12 and the lower surface of the upper mold 3 to prevent leakage of air from the pneumatic cylinder 9 into the chamber 7.

A pressure regulator 21 includes a connector 23 fitted in the upper mold 3. The connector 23 has an air passage 22 in fluid communication with the chamber 7. The air passage 22 is connected to a release conduit 25 through a release valve 24 and a discharge conduit 27 through a discharge valve 26. The conduit 27 at the other end is coupled to a vacuum pump 28. The pressure regulator 21 further includes a controller 29 which delivers a first command to open the discharge valve 26, close the release valve 24, and actuate the vacuum pump 28 so that air in the chamber 7 is exhausted outside or delivers a second command to close the discharge valve 26 and open the release valve 24, allowing the ambient air to flow into the chamber 7 through the release valve 24. A pressure sensor 30 connected to the controller 29 through a lead 31 is fitted in the upper mold 3 for detecting the pressure in the chamber 7. In response to a detection signal from the pressure sensor 30, the controller 29 performs to actuate the vacuum pump 28 and change over the release and discharge valves 24 and 26. Accordingly, when the controller 29 delivers a first command to open the discharge valve 26, close the release valve 24, and actuate the vacuum pump 28, air in the chamber 7 is discharged outside so that the chamber 7 is kept under a subatmospheric pressure. At the same time, air in the cavity 8 is discharged outside through the gap 11 between the partition 6 of the insert 4 and the upper mold 3 and then the chamber 7 so that the cavity 8 is also kept under a subatmospheric pressure. When the vacuum pump 28 is interrupted, the discharge valve 26 is closed, and the release valve 24 is opened, the atmospheric pressure will be restored in the chamber 7 and also in the cavity 8 through the gap 11.

Described now is the molding of a part as shown in FIG. 11 from flexible polyurethane foam using the above-mentioned mold assembly. The lower mold 2, upper mold 3 and insert 4 are roughly assembled as shown in FIGS. 1 and 2. A flexible polyurethane foam molding compound is introduced into the mold cavity. The upper mold 3 is mated with the lower mold 3. The mold assembly is tightly closed. The controller 29 delivers a first command to open the discharge valve 26, close the release valve 24, and actuate the vacuum pump 28. Then air in the chamber 7 is discharged outside and air in the cavity 8 is also discharged outside through the gap 11 and the chamber 7 so that the cavity 8 is kept under a subatmospheric pressure. When the pressure sensor 30 detects that the predetermined degree of vacuum is reached in the chamber 7, the controller 29 delivers a command to control the vacuum pump 28, release valve 24, and discharge valve 26 to maintain the desired degree of vacuum. More particularly, if the pressure is higher than the target value, then the discharge valve 26 is opened to further discharge air outside. If the pressure is lower than the target value, then the release valve 24 is opened to supplement air.

Under the thus established vacuum, the molding compound is expanded and molded. Thereafter, the controller 29 delivers a command to open the release valve 24 and close the discharge valve 26 whereby atmospheric pressure is restored in the chamber 7 and cavity 8. In this state, the upper mold 3 and insert 4 are detached from the lower mold 2. Since the upper mold 3 is detached from the lower mold 2 after the restoration of atmospheric pressure in the chamber 7 and cavity 8, mold separation can be done smoothly. If the vacuum is kept in the chamber 7 and cavity 8, it is difficult to remove the upper mold 3 from the lower mold 2.

After the upper mold 3 and insert 4 are detached from the lower mold 2 in this way, the molded part is taken out.

According to the invention, the cavity 8 is under subatmospheric pressure prior to foam molding. The pressure reduction from the atmospheric pressure is preferably 10 to 500 mmHg, more preferably 100 to 300 mmHg. The degree of lowering the density of foam depends on the magnitude of subatmospheric pressure.

The gap 11 between the upper mold 3 and the insert partition 6 is preferably 0.01 to 2 mm, more preferably 0.05 to 0.5 mm, most preferably 0.05 to 0.2 mm.

Figure 3:
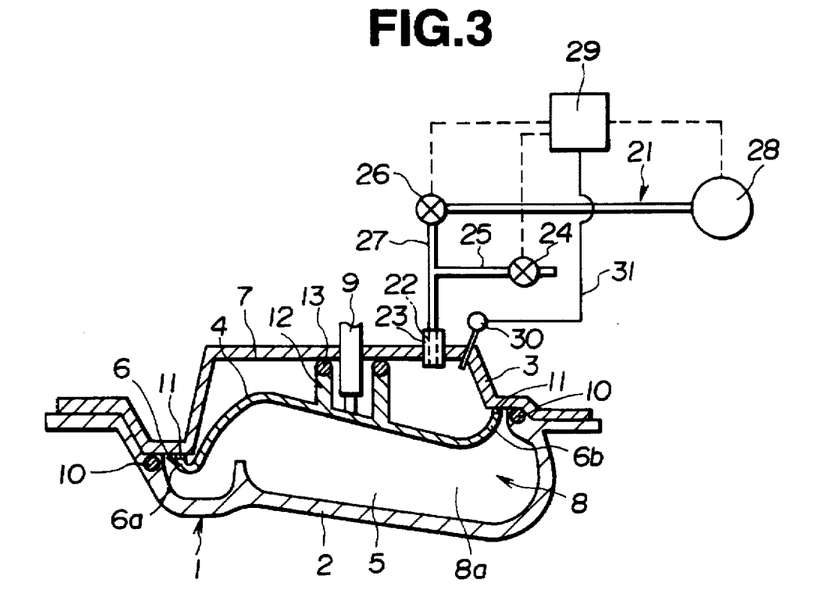
FIG. 3 is a schematic cross-sectional view in one direction of a mold assembly for a front cushion pad according to another embodiment of the invention.
Figure 4:
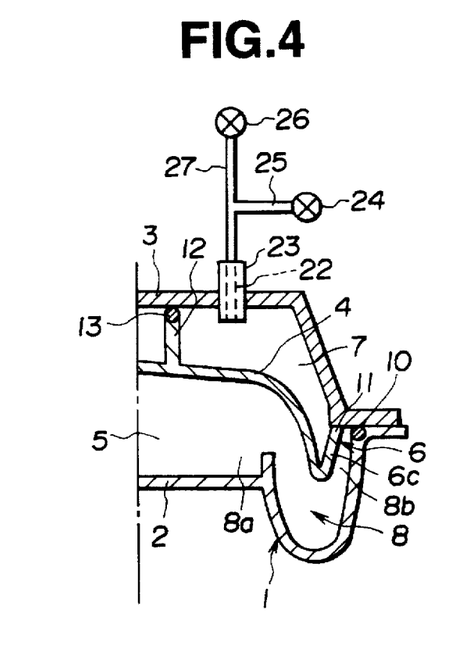
FIG. 4 is a schematic cross-sectional view in a perpendicular direction of the same mold assembly as in FIG. 3.

FIGS. 3 and 4 show a mold assembly for use in molding an automotive front cushion pad according to a second embodiment of the invention. This mold assembly 1 is substantially the same as the first embodiment of FIGS. 1 and 2 except that the cavity 8 is defined substantially between the lower mold 2 and the insert 4 and the rear portion-molding cavity 8c in FIG. 1 is omitted. The method of molding synthetic resin foam parts using this mold assembly is also the same as the first embodiment. In FIGS. 3 and 4, like parts are designated by the same numerals as in FIGS. 1 and 2 and their description is omitted.

Figure 5:
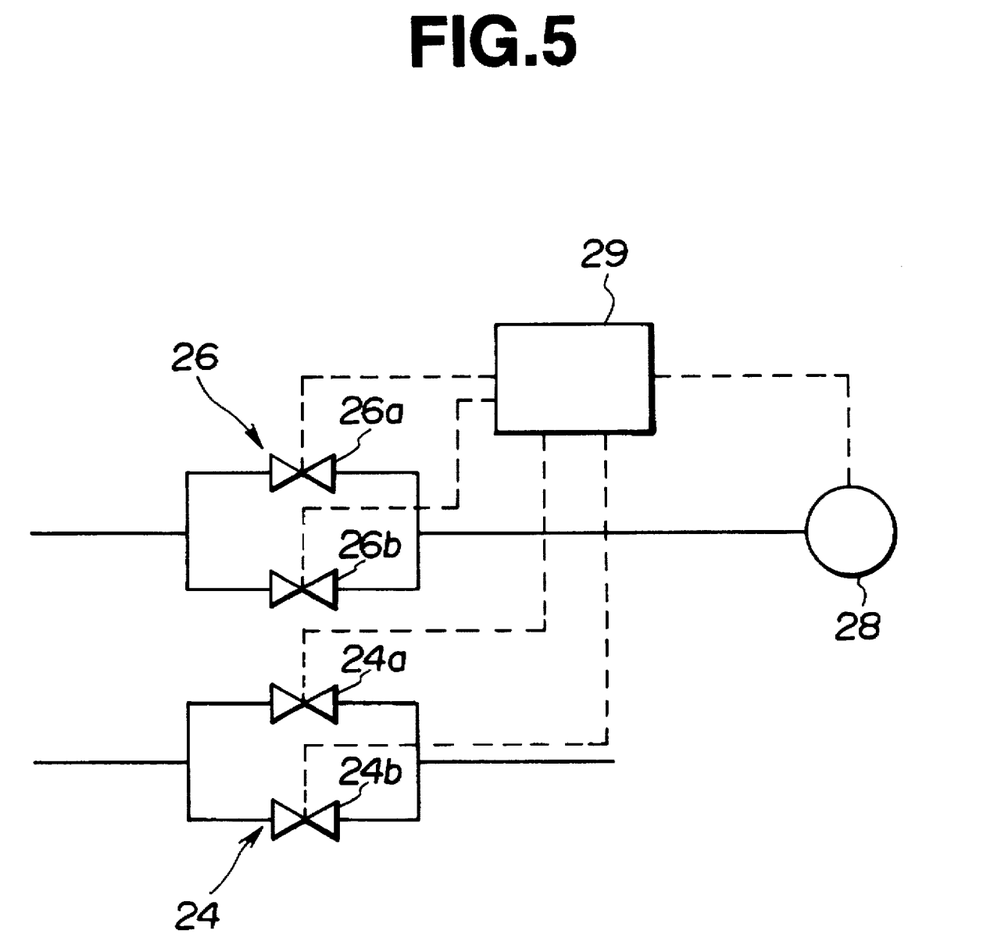
FIG. 5 is a block diagram of the arrangement of discharge and release valves used in the front back pad mold assembly according to a further embodiment.

FIG. 5 shows a variant of the first embodiment shown in FIGS. 1 and 2. The discharge valve 26 includes a first discharge valve 26a in the form of an electromagnetic valve having a large diameter air flowpath and a second discharge valve 26b in the form of an electromagnetic valve having a small diameter air flowpath which are connected in parallel in the discharge conduit 27. The first and second discharge valves 26a and 26b are coupled to the controller 29 so that their operation is controlled by a command from the controller 29 whereby air is passed through the first discharge valve 26a or the second discharge valve 26b. In a further preferred embodiment, as shown in FIG. 5, the release valve 24 includes a first release valve 24a in the form of an electromagnetic valve having a large diameter air flowpath and a second release valve 24b in the form of an electromagnetic valve having a small diameter air flowpath which are connected in parallel in the release conduit 25. The first and second release valves 24a and 24b are coupled to the controller 29 so that their operation is controlled by a command from the controller 29 whereby air is passed through the first release valve 24a or the second release valve 24b.

When a part as shown in FIG. 11 is molded from flexible polyurethane foam using the above-mentioned mold assembly, the lower mold 2, upper mold 3 and insert 4 are assembled in the same sequence as described in conjunction with FIGS. 1 and 2. A flexible polyurethane foaming molding compound is introduced into the mold cavity. The mold assembly is tightly closed. The controller 29 delivers a command to close the release valve 24, open the large diameter discharge valve 26a of the discharge valve 26, and actuate the vacuum pump 28. Then air in the chamber 7 is discharged outside and air in the cavity 8 is also discharged outside through the gap 11 and the chamber 7 so that the cavity 8 is kept under a subatmospheric pressure. When the pressure sensor 30 detects that the predetermined degree of vacuum is reached in the chamber 7, the controller 29 delivers a command to close the large diameter discharge valve 26a and open the small diameter discharge valve 26b to maintain the target subatmospheric pressure. More particularly, if the pressure is higher than the target value, then the small diameter discharge valve 26b is opened to discharge air from the chamber 7. If the pressure is lower than the target value, then the small diameter release valve 24b is opened to supplement air.

The large diameter discharge valve is used when it is desired that the pressure in the chamber 7 reach the target value as fast as possible. The small diameter discharge and release valves are used when it is desired that air discharge or supplement is repeated in the vicinity of the target vacuum. If pressure control in the vicinity of the target vacuum is carried out only through the large diameter discharge valve, there would occur substantial pressure fluctuations. In an extreme case, such pressure fluctuations affect the surface of flexible polyurethane foam, resulting in irregular and collapsed cells. In the preferred embodiment shown in FIG. 5, the large diameter discharge valve 26a is used until the target pressure is reached or approached so that the chamber 7 may be quickly evacuated. Once the target pressure is reached, the small diameter discharge valve 26b is used preferably in combination with the small diameter release valve 24b so that fine pressure adjustment is possible. Stable pressure control can be done in the vicinity of the target pressure, substantially avoiding cell collapse. The fine pressure control is advantageous particularly when foam molding is carried out in the cavity 8 under a subatmospheric pressure of lower than 560 mmHg, especially lower than 460 mmHg. The small diameter discharge valve 26b and release valve 24b are capable of pressure control with an error within ±5% or ±20 mmHg with respect to the target pressure. In contrast, the large diameter discharge valve 26a and release valve 24a are given a tolerance of more than ±5% or ±20 mmHg with respect to the target pressure, for example, more than ±10% or ±30 mmHg with respect to the target pressure. In this regard, the small diameter discharge valve 26b and release valve 24b preferably have a minimum diameter of 1 to 30 mm when they are open, and the large diameter discharge valve 26a and release valve 24a preferably have a minimum diameter of 10 to 50 mm when they are open. The valve size may be suitably selected since it varies with the mold cavity volume, chamber volume, seal tightness and vacuum pump capacity.

Figure 6:
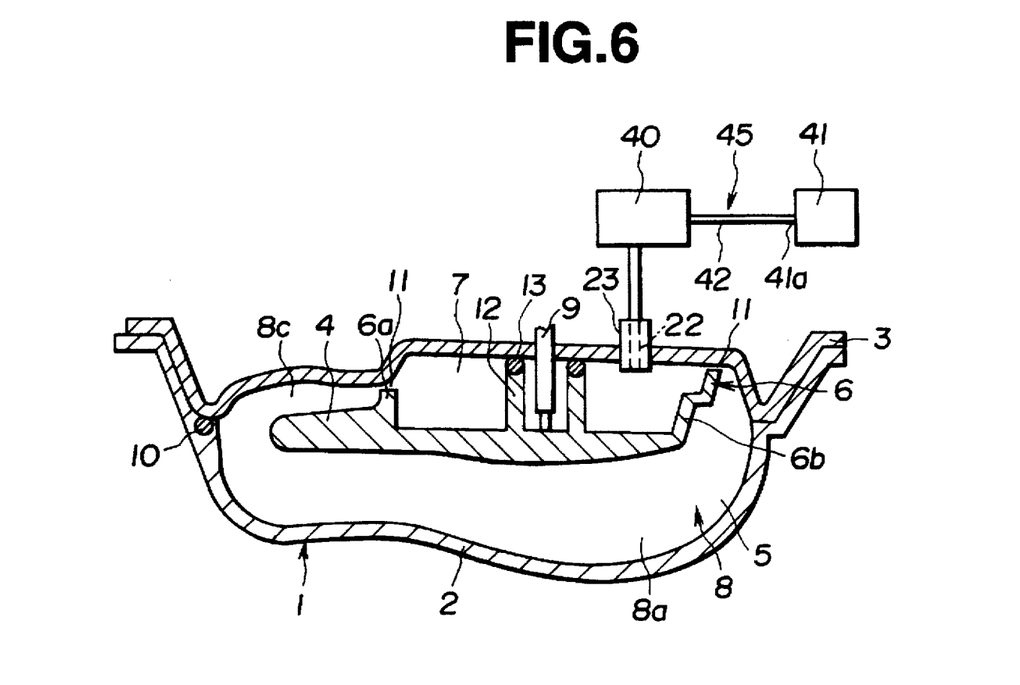
FIG. 6 is a schematic cross-sectional view in one direction of a mold assembly for a front back pad according to a still further embodiment of the invention.
Figure 7:
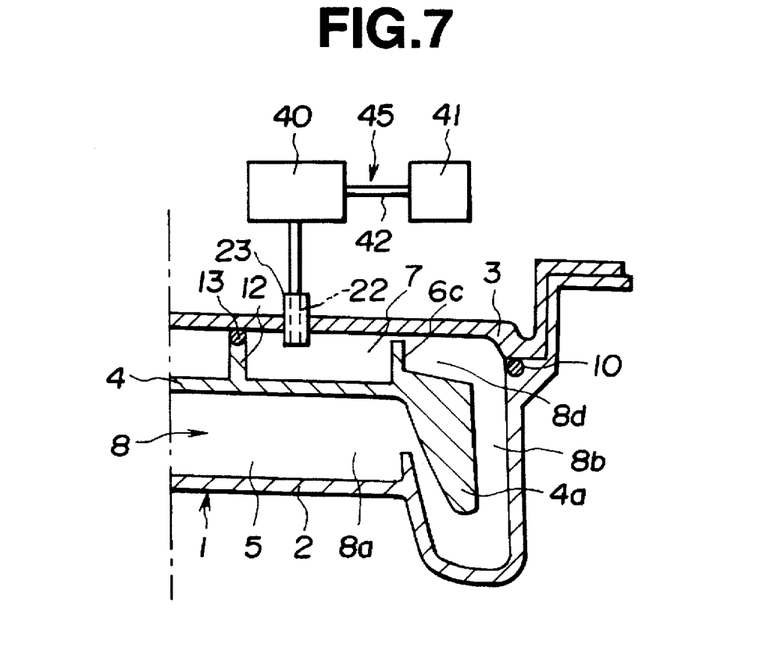
FIG. 7 is a schematic cross-sectional view in a perpendicular direction of the same mold as in FIG. 6.
Figure 8:
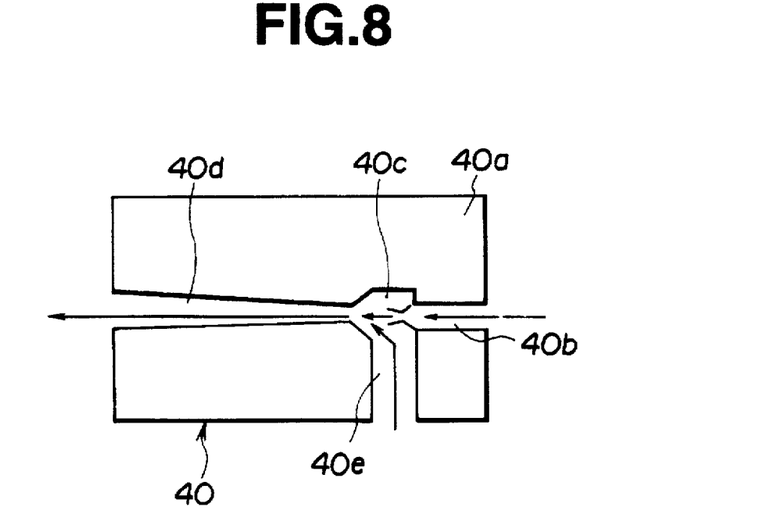
FIG. 8 is a schematic cross-sectional view of an ejector.

FIGS. 6 to 9 illustrates a third embodiment of the invention. This embodiment is substantially the same as the first embodiment of FIGS. 1 and 2 except that a pressure regulator 45 including an ejector or vacuum generator 40 and an air tank 41 is used. As shown in FIG. 8, the ejector 40 includes an ejector body 40a, a compressed air flowpath 40b and a discharge path 40d defined in the ejector body 40a in alignment, a nozzle 40c disposed between the flowpath 40b and discharge path 40d, and a suction branch 40e in communication with the jet outlet of the nozzle 40c. The discharge path 40d is divergent or increases its diameter from the inner end to the outer end and serves as a diffuser. The compressed air flowpath 40b of the ejector 40 is connected to a compressed air outlet 41a of the air tank 41 full of compressed air through a conduit 42. The suction branch 40e is connected to the air passage 22 of the connector 23 in fluid communication with the chamber 7. Upon use, the compressed air in the air tank 41 is introduced into the flowpath 40b of the ejector 40, ejected from the nozzle 40c as a jet, and discharged outside through the discharge path 40d while reducing the pressure. At the same time, air in the suction branch 40e is sucked by and discharged with the compressed air flow through the discharge path 40d from the air tank 41. Then air in the chamber 7 in fluid communication with the branch 40e and air in the cavity 8 which is in fluid communication with the chamber 7 through the gap 11 are sucked. As a result, the chamber 7 and cavity 8 are kept in vacuum. When air supply from the air tank 41 is interrupted, ambient air will flow from the outside into the discharge path 40d and then into the chamber 7 and cavity 8 through the branch 40e. Atmospheric pressure is restored in the chamber 7 and cavity 8 in this way.

Figure 9:
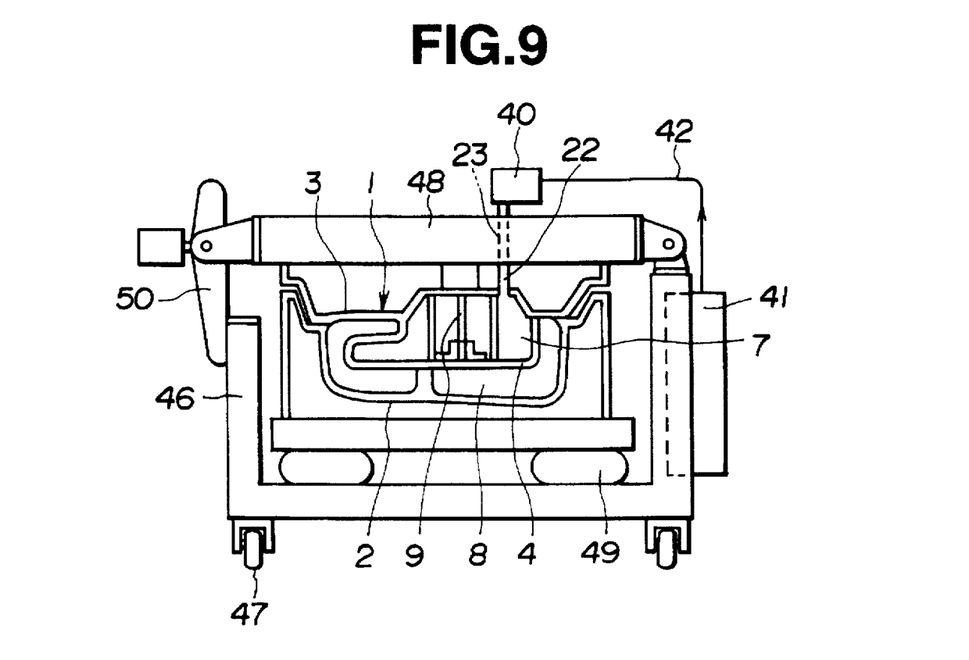
FIG. 9 is a partially cut-away, side elevation of a carriage on which the mold assembly is mounted.

As shown in FIG. 9, the mold assembly according to the third embodiment of the invention is mounted on a carriage 46. The carriage 46 is equipped with tire wheels 47 for free travel and travels along a circulating race track line as shown in FIG. 10.

In FIG. 9, the upper mold 3 is fixedly secured to a frame 48. Contractible air bags 49 are rested on the carriage 46 to support the lower mold 2. When the air bags 49 are contracted, the lower mold 2 is separated from the upper mold 3 so that the mold assembly 1 is open and chargeable with a foam molding compound. When the air bags 49 are inflated, the lower mold 2 is lifted to tightly engage with the upper mold 3. 50 is a clamp.

When a part of flexible polyurethane foam as shown in FIG. 11 is molded in the mold assembly 1 mounted on the carriage 46, the lower mold 2, upper mold 3 and insert 4 are loosely set as shown in FIGS. 6 and 7. The carriage 46 is moved to a charging position A (see FIG. 10) where a flexible polyurethane foam foaming compound is supplied into the mold cavity. The mold assembly is tightly closed. Then compressed air is introduced from the air tank 41 into the ejector 40 to keep the chamber 7 and hence, the cavity 8 of the mold assembly in a subatmospheric pressure. The compound is then expanded and molded. The carriage 46 enters a heating furnace B and advances therethrough while the expanded part is cured under the subatmospheric pressure. After exiting the furnace B, the carriage 46 reaches an unloading position C. At this point, the supply of compressed air from the air tank 41 to the ejector 40 is interrupted. Then atmospheric pressure is restored in the chamber 7 and cavity 8. The restoration of atmospheric pressure in the chamber 7 and cavity 8 allows the upper mold 3 to be removed from the lower mold 2. After the upper mold 3 and insert 4 are removed from the lower mold 2, the molded part is taken out. The process is repeated along the path shown in FIG. 10.

EXAMPLE

Examples of the present invention are given below by way of illustration and not by way of limitation.

Example 1

An automotive front back pad was molded using the mold assembly shown in FIGS. 1 and 2. The vacuum pump used was a dry pump having a discharge capacity of 235 liter/min. (KRX-3SS manufactured by Orion K.K.). The discharge and release valves used were high vacuum electromagnetic valves having a permissible pressure range of $10^{-8}$ Torr to 2 kgf/cm$^2$ (HVB type manufactured by CKD). The pressure sensor used was a pressure transmitter having a sensitive pressure range of −0.5 to 0.5 kgf/cm$^2$ (KH25 manufactured by Nagano Instrument K.K.). The gap 11 was about 0.1 mm. The mold cavity had a volume of 28.7 liters. The polyurethane foam molding compound used was a back pad-forming versatile HR foam formulation commercially available from Bridgestone Corp. This formulation produces a foam having a density of 0.035 g/cm$^3$ when it is allowed to expand free without using a mold.

First, 1,300 grams of the molding compound was introduced into the mold cavity and expanded and molded therein while the mold cavity was continuously kept under atmospheric pressure (without evacuation). A foam part having a density of 0.042 was obtained. No foam parts having a lower density could be obtained. The foam part had a noticeable amount of burrs cured at the parting line between the lower and upper molds.

Next, 1,100 grams of the molding compound was introduced into the mold cavity, and the cavity pressure was then reduced by 100 mmHg. The compound was expanded and molded in the cavity while the mold cavity was kept under the subatmospheric pressure. A foam part having a density of 0.038 g/cm$^3$ was obtained. The foam part had few burrs. Detachment of the upper mold from the lower mold was difficult if the chamber and cavity were kept under vacuum, but easy after atmospheric pressure was restored in the chamber and cavity.

Similarly, 970 grams of the molding compound was introduced into the mold cavity, and the cavity pressure was then reduced by 300 mmHg. The compound was expanded and molded in the cavity while the mold cavity was kept under the subatmospheric pressure. A foam part having a density of 0.030 g/cm$^3$ was obtained. The foam part had no burrs at all. Detachment of the upper mold from the lower mold was easy after atmospheric pressure was restored in the chamber and cavity.

Example 2

An automotive front cushion pad was molded using the mold assembly shown in FIGS. 3 and 4. The vacuum pump, discharge valve, release valve, and pressure sensor used were the same as in Example 1. The gap 11 between the upper mold 3 and the insert 4 was about 0.1 mm over the entire periphery. The mold cavity had a volume of 28 liters. The polyurethane foam molding compound used was a cushion-forming high restitution foam formulation commercially available from Bridgestone Corp. This formulation produces a foam having a density of 0.042 g/cm$^3$ when it is allowed to expand free without using a mold.

First, 1,500 grams of the molding compound was introduced into the mold cavity and expanded and molded therein while the mold cavity was continuously kept under atmospheric pressure (without evacuation). There was obtained a foam part having an overall density of 0.050 g/cm$^3$. No foam parts having a lower density could be obtained. Air voids were formed in the front surface of the cushion pad. Foam parts having a density of 0.050 g/cm$^3$ or more had a noticeable amount of burrs cured at the parting line between the lower and upper molds.

Next, 1,320 grams of the molding compound was introduced into the mold cavity, and the cavity pressure was then reduced by 100 mmHg. The compound was expanded and molded in the cavity while the mold cavity was kept under the subatmospheric pressure. There was obtained a foam part having a density of 0.045 g/cm$^3$. The foam part had few burrs. Detachment of the upper mold from the lower mold was difficult if the chamber and cavity were kept under vacuum, but easy after atmospheric pressure was restored in the chamber and cavity.

Similarly, 1,180 grams of the molding compound was introduced into the mold cavity, and the cavity pressure was then reduced by 200 mmHg. The compound was expanded and molded in the cavity while the mold cavity was kept under the subatmospheric pressure. A foam part having a density of 0.040 g/cm$^3$ was obtained. The foam part had no burrs at all. Detachment of the upper mold from the lower mold was easy after atmospheric pressure was restored in the cheer and cavity.

Example 3

An automotive front back pad was molded using the mold assembly shown in FIGS. 1, 2 and 5. The vacuum pump used was a pump having a discharge capacity of 300 liter/min. The large diameter discharge and release valves used were high vacuum electromagnetic valves having an air flowpath with a minimum diameter of 22 mm. The small diameter discharge and release valves used were high vacuum electromagnetic valves having an air flowpath with a minimum diameter of 9 mm or 5 mm. The pressure sensor used was a pressure transmitter having a sensitive pressure range of −0.5 to 0.5 kgf/cm$^2$ (KH25 manufactured by Nagano Instrument K.K.). The gap 11 was about 0.1 mm. The mold cavity had a volume of 28.7 liters. The polyurethane foam molding compound used was a back pad-forming versatile HR foam formulation commercially available from Bridgestone Corp. (see Example 1).

First, 900 grams of the molding compound was introduced into the mold cavity, and the cavity pressure was then reduced by 300 mmHg. The compound was expanded and molded in the cavity while the mold cavity was kept under vacuum. More specifically, using the large diameter discharge valve, the chamber was evacuated to reduce the pressure by 300 mmHg (i.e., subatmospheric pressure =460 mmHg). Thereafter, using the large diameter discharge valve and release valve, the pressure in the chamber was controlled so as to keep the pressure reduction of 300 mmHg. However, pressure fluctuations of ±25 mmHg (±8.5%) with respect to the target pressure occurred. The resulting foam part had collapsed cells on its surface.

In another run, using the large diameter discharge valve, the chamber was evacuated to reduce the pressure by 300 mmHg. Thereafter, using the small diameter discharge valve and release valve having an open diameter of 9 mm, the pressure in the chamber was controlled to keep the pressure reduction of 300 mmHg. Pressure fluctuations were only ±10 mmHg (±3%) with respect to the target pressure. When the small diameter discharge valve and release valve having an open diameter of 5 mm were used for pressure control, pressure fluctuations were only ±5 mmHg (±1.5%) with respect to the target pressure. The resulting foam parts had no collapsed cells on its surface and a good outer appearance. The resulting foam part had a density of 0.032 g/cm³ and no burrs at all.

Example 4

An automotive front back pad was molded by using a mold assembly as shown in FIGS. 6 to 8, mounting it on a carriage as shown in FIG. 9, and circulating it along a circulating line as shown in FIG. 10. The ejector used was an ejector model YPA08QR manufactured by CKD. The ejector was operated under conditions including a supply air pressure of 2 kgf/cm², an air consumption amount of 20 liter/min., an operating time of 1½ minutes, and an ultimate pressure reduction of 200 mmHg. The air tank was filled with 50 liters of air and 30 liters of air was used. The gap 11 was about 0.1 mm. The mold cavity had a volume of 25 liters. The polyurethane foam molding compound used was a back pad-forming versatile HR foam formulation commercially available from Bridgestone Corp. (see Example 1).

The molding compound, 900 grams, was introduced into the mold cavity. By operating the ejector, the cavity pressure was then reduced by 200 mmHg. The compound was expanded and molded in the cavity while the mold cavity was kept under the subatmospheric pressure. The resulting foam part had a density of 0.034 g/cm³ and no burrs at all.

Although some preferred embodiments have been described, many modifications and variations may be made thereto in the light of the above teachings. It is therefore to be understood that within the scope of the appended claims, the invention may be practiced otherwise than as specifically described.

We claim:

1. A mold apparatus for producing a synthetic resin foam part, comprising a mold assembly comprising a lower mold having an upward open recess, an upper mold removably attached to the lower mold to cover the open recess to define a closed space, and an insert removably disposed in the closed space, wherein the insert on its upper surface is provided with a partition which is faced to said upper mold through a gap, the partition defines a chamber between the upper surface of the insert and the upper mold, and said closed space excluding said chamber constitutes a cavity into which a synthetic resin foam molding compound is introduced, and a pressure regulator means for exhausting air from the chamber to keep the chamber in a subatmospheric pressure whereby air in the cavity is also exhausted through the gap when air in the chamber is exhausted.

2. The mold apparatus of claim 1 wherein said pressure regulator means includes means for supplying air into the subatmospheric chamber to restore atmospheric pressure in the chamber whereby air is also supplied to the cavity through the gap when air is supplied into the chamber.

3. The mold apparatus of claim 1 wherein the synthetic resin foam part is a flexible polyurethane foam part.

4. The mold apparatus of claim 3 for molding an automotive seat pad of flexible polyurethane foam wherein said insert partition has a front portion spaced from a front end of the insert wherein a top pad-molding cavity is defined between the upper surface of the insert and the upper mold and between the front end of the insert and the front portion of said insert partition.

5. The mold apparatus of claim 1 wherein said pressure regulator means includes a discharge conduit having one end connected to said chamber and another end connected to a vacuum pump, and parallel large and small diameter discharge valves inserted in the discharge conduit in a switchable relationship so that either one of the large and small diameter discharge valves may be selected, air in said chamber is exhausted through the large diameter discharge valve until nearly the subatmospheric pressure is established in the chamber, and thereafter switching is made to select the small diameter discharge valve for further continuing air exhaustion.

6. The mold apparatus of claim 1 wherein said pressure regulator means comprises an ejector and an air tank filled with compressed air, said ejector including a flowpath connected to the air tank, a nozzle at an outlet of the flowpath for ejecting compressed air incoming from the tank through the flowpath, a discharge flowpath for discharging compressed air ejected from the nozzle, and a suction branch in fluid communication with a position where compressed air is ejected from the nozzle, and the suction branch is connected to the chamber in the mold assembly, wherein compressed air in the air tank is ejected from the nozzle to form a jet by which air in the suction branch is exhausted and discharged through the discharge flowpath, whereby the chamber in the mold assembly in communication with the suction branch is evacuated.

7. The mold apparatus of claim 6 which is mounted on a movable carriage wherein the carriage travels through a heating furnace while the mold cavity is kept in the subatmospheric pressure.

8. The mold apparatus of claim 1 wherein said gap is in the range of 0.01 to 2.0 mm.

9. The mold apparatus of claim 1 wherein said gap is in the range of 0.05 to 0.2 mm.

* * * * *